United States Patent

[11] 3,601,183

[72] Inventors Ingolf Ottomar Eugen Lohner
33 Flatowstraese 8,, Braunschweig;
Endre Jeno Tary, 318 Graf Bernadatte-
Weg 1,, Wolfsburg; Eckhart Hoffmann,
3183 Rischfeldweg 5,, Fallersleben;
Hermann Eckhard Kiefer, 318 J. F.
Kennedy Allee 78, Wolfsburg, all of,
Germany
[21] Appl. No. 858,806
[22] Filed Sept. 17, 1969
[45] Patented Aug. 24, 1971
[32] Priority Sept. 20, 1968
[33] Germany
[31] P 17 76 096.2

[54] DEVICE FOR HEATING GAS MIXTURES
6 Claims, 1 Drawing Fig.
[52] U.S. Cl. .................................................... 165/35,
165/39, 165/52
[51] Int. Cl. .................................................... B60h 1/00
[50] Field of Search ............................................ 165/35, 39,
103, 81, 52

[56] References Cited
UNITED STATES PATENTS
1,931,781  10/1933  Weber .......................... 165/51

*Primary Examiner*—Charles Sukalo
*Attorney*—Watson, Cole, Grindle & Watson

ABSTRACT: A device for the intensive and regulated heating of gas mixtures in a suction tube having a carburetor located therealong, the suction tube being connected to an engine and the device comprising a bypass tube connected with the suction tube, means associated with the bypass tube to heat the gas mixture passing therethrough, and flap valve means located in the suction tube.

PATENTED AUG24 1971  3,601,183
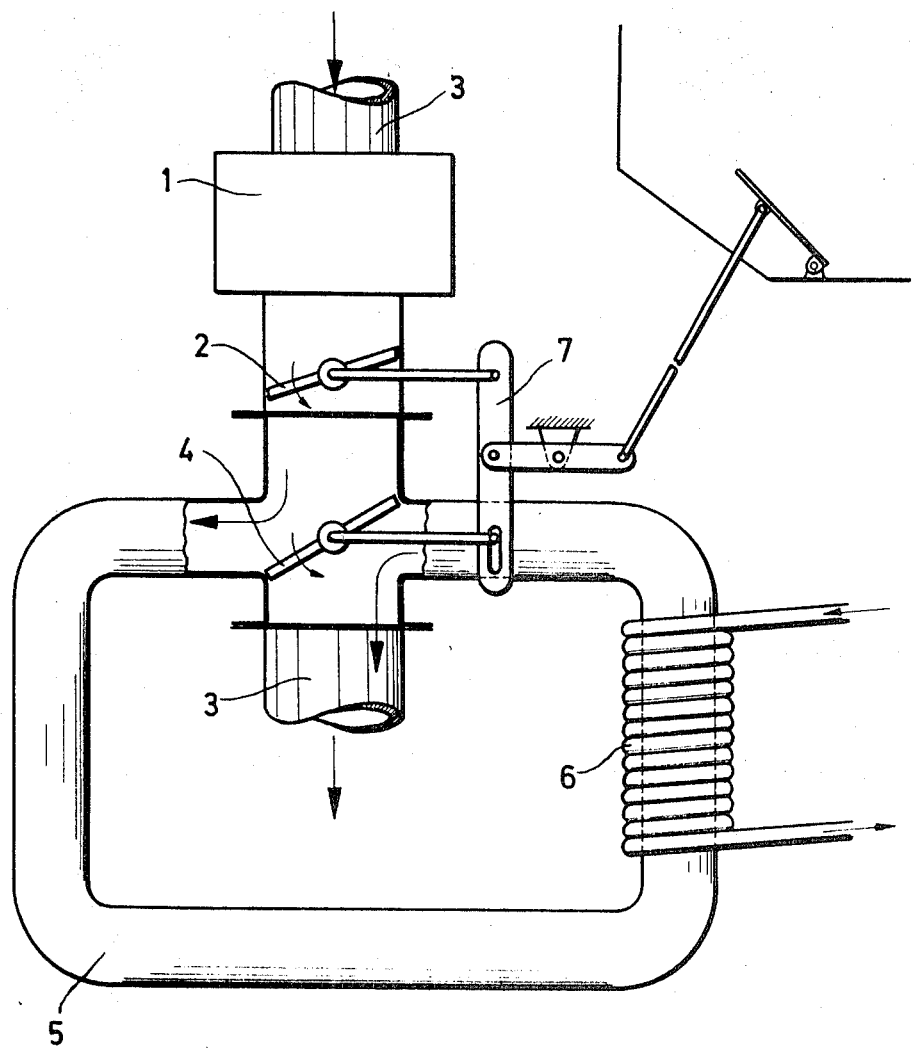
INVENTORS
Ingolf O. E. Lohner
BY Endre J. Tary
Eckart Hoffmann
Hermann E. Kiefer
Watson, Cole, Grindle & Watson Attys.

DEVICE FOR HEATING GAS MIXTURES

This invention relates to a device for the intensive and regulated heating of mixtures for internal combustion machines and engines.

By the heating of the gas mixture there is avoided, in cold engines, that the vaporized fuel mixture will again be condensed on the cold cylinder walls and thus a less concentrated gas mixture will be produced for burning so that the efficiency of the motor will be reduced. In connection with a very hot motor, however, it is not desired to provide preliminary heating of the mixture due to the then undesired insufficient filling. What one strives to accomplish is a regulated mixture heating which will more or less be operative relative to the driving conditions of the motor.

Various different devices are known for carrying out the heating of gas mixtures which are however distinguished essentially from the present invention. In the structure according to the present application it is an object to provide an apparatus for heating gas mixtures for internal combustion engines in which there is provided a flap valve in the suction tube which in its lateral position will close connection to the combustion space and the entire gas mixture will then be directed over a section which is provided with a heat exchanger before the mixture is directed into the combustion space.

The advantages of the invention are contained therein, in that the position of the flap valve is dependent upon the position of the throttle valve by mechanical coupling with the control means whereby the particular position of the switching valve can be automatically adjusted for heating the mixtures in order to take into consideration the driving conditions of the motor. The thus improved mixture for the motor will be operative not only for idling of the motor but also under full speed and power thereof, so that there will be a distinct improvement in the condition of the exhaust gases. By preliminary heating and by the proper operation of the flap valves, there will be a more efficient operation of the motor with increasing power and there will be no danger of a "knocking" in the motor itself. By a better mixture of the fuel, there will result a reduced power requirement.

Further objects of the invention will be apparent from the following description when considered in connection with the accompanying drawing in which the single FIGURE is a diagrammatic view of a heater applied to the fuel flow from a carburetor to the engine.

Numeral 1 indicates a carburetor and behind the throttle valve 2, there is a suction tube 3 in communication with a switch valve 4 which is operative in such a way that when the valve 4 is closed, the mixture will be directed through a bypass tube 5 in proximity to a heat exchanger 6 in which the gas mixture is heated before it reaches the combustion chamber. The arrows in the tube 6 indicate the direction of flow of a heating medium which may be either liquid or some other fluid. The two valves 2 and 4 are interconnected with one another by means of a guide link 7. Upon the opening of the flap valve 2, the valve 4 is still closed. Upon final opening of the accelerator valve upon full power demand, the valve 4 will be opened and thus the gas mixture will be heated. The drawing shows the position of the flap valves for idling position. When the engine is accelerated, the flap valve 2 and later the valve 4 will be opened in the direction of the arrows until the valves are parallel to the longitudinal axis of the suction tube 3 and then the preheating of the mixture through the bypass tube 5 will be avoided. The tube 3 is connected to an intake manifold, not shown, or directly to an engine, not shown.

We claim:

1. A device for the intensive and regulated heating of gas mixtures in a suction tube having a carburetor located therealong, said suction tube being connected to an engine and said device comprising a bypass tube connected with said suction tube, means being associated with said bypass tube to heat the gas mixture passing therethrough, a first flap valve being located in said suction tube between said carburetor and said bypass tube and a second flap valve being located in said suction tube at the connection junction with said bypass valve, and means being provided to operatively interconnect said valves to operate and to set said valves in operative relationship to one another.

2. A device according to claim 1 wherein said interconnection means includes a link having means connected to said valves to adjust them relative to one another.

3. A device according to claim 2 wherein said adjustment means for said valves are operative to adjust said valves by means of a connected pedal in the floor of a vehicle.

4. A device according to claim 1, in which said heating means is in the form of a tubular coil disposed about said bypass tube and acting as a heat exchanger.

5. A device according to claim 1, in which said heating means is in the form of a tubular coil disposed about said bypass tube and acting as a heat exchanger, and through which a fluid medium is forced.

6. A device according to claim 1, in which said bypass tube is so connected with said suction tube as to form a tubular circuit for the gas mixture, and said heating means being disposed about a portion of the tubular circuit.